(12) United States Patent
Grohol et al.

(10) Patent No.: US 8,871,676 B2
(45) Date of Patent: Oct. 28, 2014

(54) METHOD FOR MAKING POROUS ACICULAR MULLITE-CONTAINING COMPOSITES

(75) Inventors: Daniel Grohol, Midland, MI (US);
Chan Han, Midland, MI (US);
Aleksander J. Pyzik, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 396 days.

(21) Appl. No.: 13/059,990

(22) PCT Filed: Sep. 18, 2009

(86) PCT No.: PCT/US2009/057416
§ 371 (c)(1),
(2), (4) Date: Feb. 21, 2011

(87) PCT Pub. No.: WO2010/033763
PCT Pub. Date: Mar. 25, 2010

(65) Prior Publication Data
US 2011/0166018 A1    Jul. 7, 2011

Related U.S. Application Data

(60) Provisional application No. 61/097,957, filed on Sep. 18, 2008.

(51) Int. Cl.
*B01J 23/00* (2006.01)
*B01J 21/00* (2006.01)
*C04B 35/195* (2006.01)
*C04B 41/50* (2006.01)
*C04B 35/185* (2006.01)

(52) U.S. Cl.
CPC .......... *C04B 35/195* (2013.01); *C04B 41/5025* (2013.01); *C04B 35/185* (2013.01)
USPC .......... 502/439; 502/251; 502/263; 502/407; 502/414; 502/415

(58) Field of Classification Search
USPC ................. 502/251, 263, 407, 414, 415, 439
See application file for complete search history.

(56) References Cited

U.S. PATENT DOCUMENTS 4,528,275 A     7/1985  Hodge
4,956,329 A *   9/1990  Chao et al. ................. 502/251

(Continued)

FOREIGN PATENT DOCUMENTS

EP      0164028 A    12/1985
WO      9001471 A     2/1990

(Continued)

*Primary Examiner* — Cam N. Nguyen

(57) ABSTRACT

Porous composites of mullite and cordierite are formed by firing an acicular mullite body in the presence of a magnesium source and a silicon source. In some variations of the process, the magnesium and silicon sources are present when the acicular mullite body is formed. In other variations, the magnesium source and the silicon source are applied to a previously-formed acicular mullite body. Surprisingly, the composites have coefficients of linear thermal expansion that are intermediate to those of mullite and cordierite alone, and have higher fracture strengths than cordierite at a similar porosity. Some of the cordierite forms at grain boundaries and/or points of intersection between mullite needles, rather than merely coating the needles. The presence of magnesium and silicon sources during acicular mullite formation does not significantly affect the ability to produce a highly porous network of mullite needles.

18 Claims, 2 Drawing Sheets

(56) References Cited

U.S. PATENT DOCUMENTS

Figure 1A:
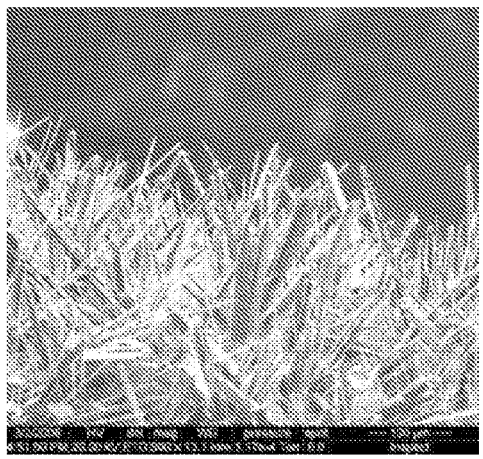

| | | |
|---|---|---|
| 5,045,514 A | 9/1991 | Ismail |
| 5,079,064 A | 1/1992 | Forsythe |
| 5,407,871 A | 4/1995 | Mizutani |
| 6,319,870 B1* | 11/2001 | Beall et al. .................... 501/119 |
| 7,067,447 B2* | 6/2006 | Campbell ..................... 501/152 |
| 7,605,110 B2* | 10/2009 | Yamada et al. ............... 502/439 |
| 7,648,548 B2* | 1/2010 | Miao et al. ...................... 55/523 |
| 7,744,980 B2* | 6/2010 | Boorom et al. ............. 428/116 |
| 7,914,874 B2* | 3/2011 | Henry et al. ................. 428/116 |
| 7,923,093 B2* | 4/2011 | Melscoet-Chauvel et al. ........................... 428/116 |
| 7,927,682 B2* | 4/2011 | Beall et al. .................... 428/116 |
| 7,964,262 B2* | 6/2011 | Brocheton et al. ............ 428/116 |
| 2005/0115214 A1* | 6/2005 | Saha et al. ...................... 55/523 |
| 2006/0018806 A1* | 1/2006 | Ziebarth et al. ................ 422/177 |
| 2006/0197265 A1* | 9/2006 | Saha et al. ..................... 264/646 |
| 2007/0203315 A1* | 8/2007 | Saha et al. ..................... 528/15 |
| 2007/0213207 A1* | 9/2007 | Saha et al. ..................... 502/263 |
| 2008/0063833 A1* | 3/2008 | Beall et al. .................... 428/116 |
| 2008/0293564 A1* | 11/2008 | Saha et al. ..................... 502/263 |
| 2009/0324946 A1* | 12/2009 | Han et al. ..................... 428/357 |

FOREIGN PATENT DOCUMENTS

| | | |
|---|---|---|
| WO | 9211219 A | 7/1992 |
| WO | 03082773 A | 10/2003 |
| WO | 2004096729 A | 11/2004 |
| WO | 2007061457 A | 5/2007 |

* cited by examiner

METHOD FOR MAKING POROUS ACICULAR MULLITE-CONTAINING COMPOSITES

This application claims benefit of U.S. Provisional Patent Application No. 61/097,957, filed 18 Sep. 2008.

This invention relates to methods for making porous mullite-cordierite composite bodies.

Acicular mullite takes the form of high aspect ratio needles. Masses of these needles form high surface area, highly porous structures, which are characterized by their excellent temperature resistance and mechanical strength. Porous acicular mullite bodies are used as particulate traps to filter soot from the exhausts emitted from power plants. The power plant may be mobile or stationary. An example of a mobile power plant is an internal combustion engine. Stationary power plants include electricity and/or steam generating units. The porous acicular mullite bodies are also useful as catalyst supports, such as supports for precious metals in automotive catalytic converters.

A convenient way of manufacturing porous acicular mullite bodies starts with a "green body" that contains a source of aluminum and silicon atoms. By heating in the presence of a fluorine source, a fluorotopaz compound having the approximate chemical formula $Al_2(SiO_4)F_2$ is formed. Fluorotopaz is then thermally decomposed to form mullite, which has the approximate chemical formula $3Al_2O_3 \cdot 2SiO_2$. The mullite crystals formed this way take the form of a mass of interconnected needles. The needles usually have diameters between 3 and 40 microns. The interconnected needles form a porous structure in which the pores constitute from 40 to 85% of the volume of the body. Approaches such as these are described in WO 90/01471, WO 99/11219, WO 03/82773 and WO 04/96729.

Acicular mullite has somewhat lower thermal shock resistance than is desired for applications such as particulate filters and catalyst supports, mainly due to its relatively high coefficient of thermal expansion, which is approximately 5.5 ppm per degree Celsius. During thermal regeneration, an acicular mullite body used in some power plant operations can experience a temperature gradient amounting to hundreds of degrees Celsius over a period of minutes or even seconds. The poor thermal shock resistance leads to cracking under these conditions. It is possible to ameliorate this problem somewhat through the design of the filter. However, a more desirable approach is to improve the thermal shock resistance by focusing on the material properties of the ceramic, while maintaining other desirable attributes such as high porosity and good mechanical integrity.

Mullite has been formed into various composites with cordierite. For example, U.S. Pat. No. 5,079,064 describes a composite containing mullite, cordierite and corundum phases and up to 50% of an amorphous glassy phase. That composite is made using S-glass fibers and alumina as starting material, and results in a composite having a complex gradient structure. These composites are said to have good thermal shock resistance. However, the composite does not have the desired highly porous structure, and for that reason is not suitable for many filtration and catalyst support applications.

EP 0 164 028 and U.S. Pat. No. 5,405,514 describe adding a cordierite phase to mullite in order to match the coefficient of thermal expansion of the mullite to that of silicon. EP 0 164 028 describes a powder sintering approach to making the composite, whereas U.S. Pat. No. 5,405,514 describes a sol-gel method followed by sintering. The composite in these cases is a compact material that is used as a substrate in integrated circuit devices. The bodies produced in these methods are not porous enough for filtration and catalyst support applications.

U.S. Pat. No. 5,407,871 describes a composite having a glassy phase with up to 45% of mullite particles dispersed in the glassy phase. The glassy phase includes cordierite crystallites. These composites are made by melting calcium carbonate, aluminum hydroxide, silica, magnesium carbonate, boric acid and zirconia together, dropping the molten mixture into water to form a frit, crushing the frit to form a glass powder, mixing mullite particles into a glass powder, molding and firing. Once again, this process does not form bodies that have significant porosity.

A method is desired by which a porous mullite body can be prepared with a lower coefficient of linear thermal expansion (CTE). The body should also have good mechanical integrity and fracture strength, and should be highly porous.

This invention is a process comprising firing an acicular mullite body in the presence of a source of silicon atoms and a source of magnesium atoms at a temperature of from 1200 to 1460° C. such that a portion of the acicular mullite reacts with the sources of silicon and magnesium atoms to form a composite body containing mullite and cordierite at a weight ratio of from 99:1 to 1:99, wherein the composite body contains at least 80% by weight combined of mullite and cordierite, has a porosity of at least 30-volume percent and a CTE no greater than 5.25 ppm/° C. over the temperature range from 20 to 800° C.

There are two main variations on the process, which can be used alternatively or in some combination. The variations involve the point in the process at which the magnesium source is provided.

In the first variation, the sources of magnesium and silicon atoms are present when the acicular mullite body is created. This variation of the process comprises the steps of:

(a) forming a green body containing a source of aluminum atoms, a source of silicon atoms and a source of magnesium atoms;

(b) heating the green body in the presence of a gaseous fluorine source at a temperature sufficient to convert a least a portion of the green body to fluorotopaz;

(c) further heating the green body at a temperature from 850° C. to 1250° C. under conditions such that the fluorotopaz decomposes to form a porous acicular mullite body that contains a source of magnesium atoms and a source of silicon atoms; and (d) further heating the acicular composite body to a temperature of from 1200 to 1460° C. under vacuum or an inert atmosphere such that a portion of the acicular mullite reacts with the source of magnesium atoms and the source of silicon atoms to form cordierite.

In a second variation of the process, the source of magnesium atoms and, if necessary, a source of silicon ions is applied to a previously-formed acicular mullite body. This is conveniently formed by coating the acicular mullite body by contacting it with a slurry of particles or solution of a magnesium compound and, if necessary, a silicon compound, and drying. The coated acicular mullite body is then fired. A portion of the mullite reacts with the magnesium and silicon sources and is converted to cordierite.

The ratio of mullite to cordierite that forms in either variation of the process can be as high as 99:1 and as low as 1:99 by weight, based on the combined weight of those phases. This ratio preferably is at least 20:80 (mullite:cordierite) and preferably does not exceed 80:20. The composite may contain phases of other materials, notably various forms of silica such as cristobalite and glassy silica, and products of incomplete reaction such as sapphirine and spinel. These other materials may constitute as much as 20% of the weight of the composite, but preferably are present in significantly lesser amounts, such as 10 weight percent or less, 5 weight percent or less, or 2 weight percent or less based on the weight of the composite. A crystalline silica phase such as cristobalite or tridymite may be present, as may a glassy silica phase. These crystalline silica phases, especially cristobalite are generally undesirable. Cristobalite undergoes a crystalline phase transition in the range of 200-250° C., which is accompanied by a volumetric expansion. This adds to the CTE of the composite and in turn can reduce the thermal shock resistance of the material. Preferred composites therefore contain no more than 2%, more preferably no more than 1% and still more preferably no more than 0.5% by weight of cristobalite. It is especially preferred that the mullite-cordierite composite contains no more than 2 weight percent of cristobalite, no more than 2 weight percent of spinel and no more than 2 weight percent of sapphirine. Most preferably, the composite contains no more than 1 percent, especially no more than 0.5%, each of cristobalite, spinel and sapphirine.

The composite has a lower CTE than acicular mullite alone. The CTE generally decreases with increasing cordierite content. Surprisingly, the CTE often approximates the theoretical CTE values that would be calculated by application of the rule of mixtures, but variations from the calculated value can be seen when phases other than mullite and cordierite are present. The CTE values for the composite materials typically range from about 1.5 to about 5.25 ppm/° C., as measured over the temperature range from 20° C. to 800° C., while heating at the rate of 5° C./minute. CTE is conveniently determined by measuring changes in the length of a sample as it is heated over that temperature range. A dilatometer such as Du Pont model 2940 dilatometer is a convenient device for measuring CTE.

The large reduction in CTE through the formation of the cordierite phase is highly desirable, but is unexpected because a continuous acicular mullite structure is either used as a starting material or formed as an intermediate. The addition of cordierite to such a structure would not be expected to result in such a large reduction of CTE in such a case, because it would be expected that the CTE would be dominated by the continuous nature of the mullite needle structure. Cordierite that forms merely on the surface of the mullite crystals in such a continuous mullite needle structure in a random fashion would be expected to have little effect on the CTE of a composite as a whole. In such a structure, the rule of mixtures would not be expected to be applicable, as the CTE is controlled mainly by one component of the composite, i.e., the mullite needle structure, due to the expected continuity of its structure. Instead, and surprisingly, some of the cordierite appears to form, at least in part, between mullite grain boundaries, possibly being concentrated at the intersections of individual mullite needles. Although the invention is not limited to any theory, cordierite that forms between grain boundaries is believed to contribute to the reduction in CTE by disrupting the continuity of the mullite needle structure. This could account for the reduction of the CTE of the composite material compared to that of the starting acicular mullite structure and, as said, often comes close to theoretical values that might be calculated from the rule of mixtures.

Another advantage of the invention is that much of the porous and needle-like structure of the acicular mullite intermediate is retained. The resulting composite structure is in most cases highly porous, with porosities that potentially range from 30 to as much as 85 volume percent and more typically range from 45 to 75% or from 48 to 65% or even from 48 to 60%. The needle-like morphology of the mullite tends to be retained in the composite, until very high cordierite concentrations are reached, although the distinctiveness of the needles tends to decrease with increasing cordierite content. The composites are useful in filtration and catalyst support applications due to their high porosity.

The composite also has mechanical strength that is much higher than that of porous cordierite alone, at an equivalent porosity.

Still another advantage of the invention is that the surfaces of the body tend to be smoother, i.e., fewer mullite needles tend to extend from the surface of the body, or extend less far on average from the surface of the body, than is the case with conventional acicular mullite bodies that do not contain significant levels of cordierite. This effect is often seen even though at comparable porosities, so that surface smoothness is not obtained at the expense of porosity. This can be very important in filter applications, because protruding needles can decrease air flow and, conversely, increase the pressures needed to operate the filter.

In another aspect, the invention is a composite containing mullite and cordierite in a weight ratio of from 99:1 to 1:99, wherein the mullite and cordierite constitute at least 80% of the weight of the composite, wherein the composite has a porosity of from 30 to 85 volume percent and a CTE of no greater than 5 ppm/° C. over the temperature range from 20 to 800° C.

Figure 1B:
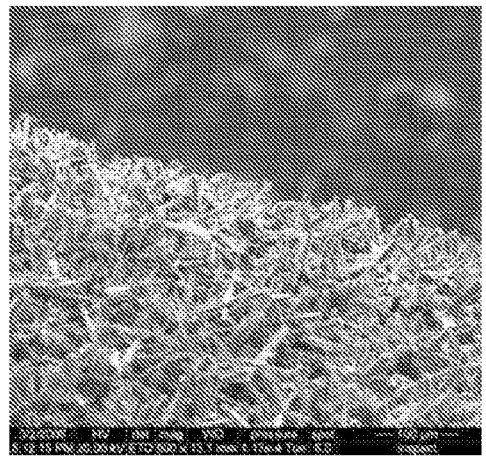
Figure 1C:
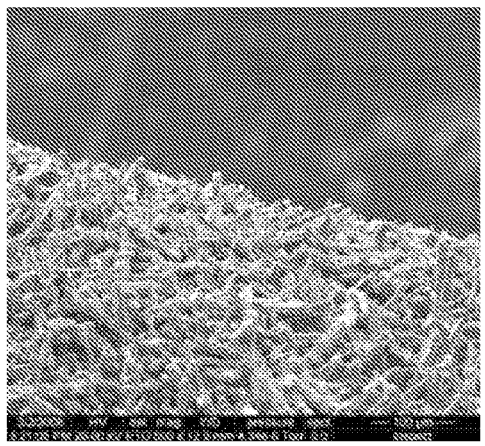
Figure 1D:
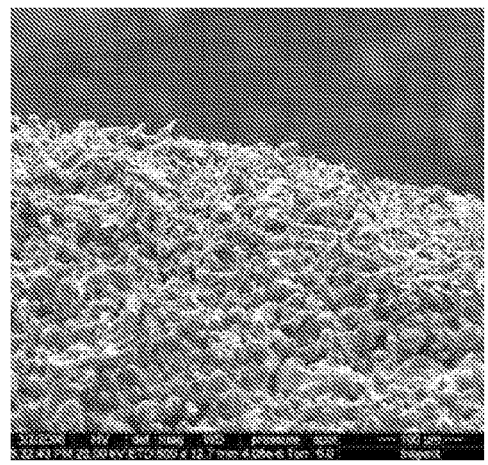
Figure 2:
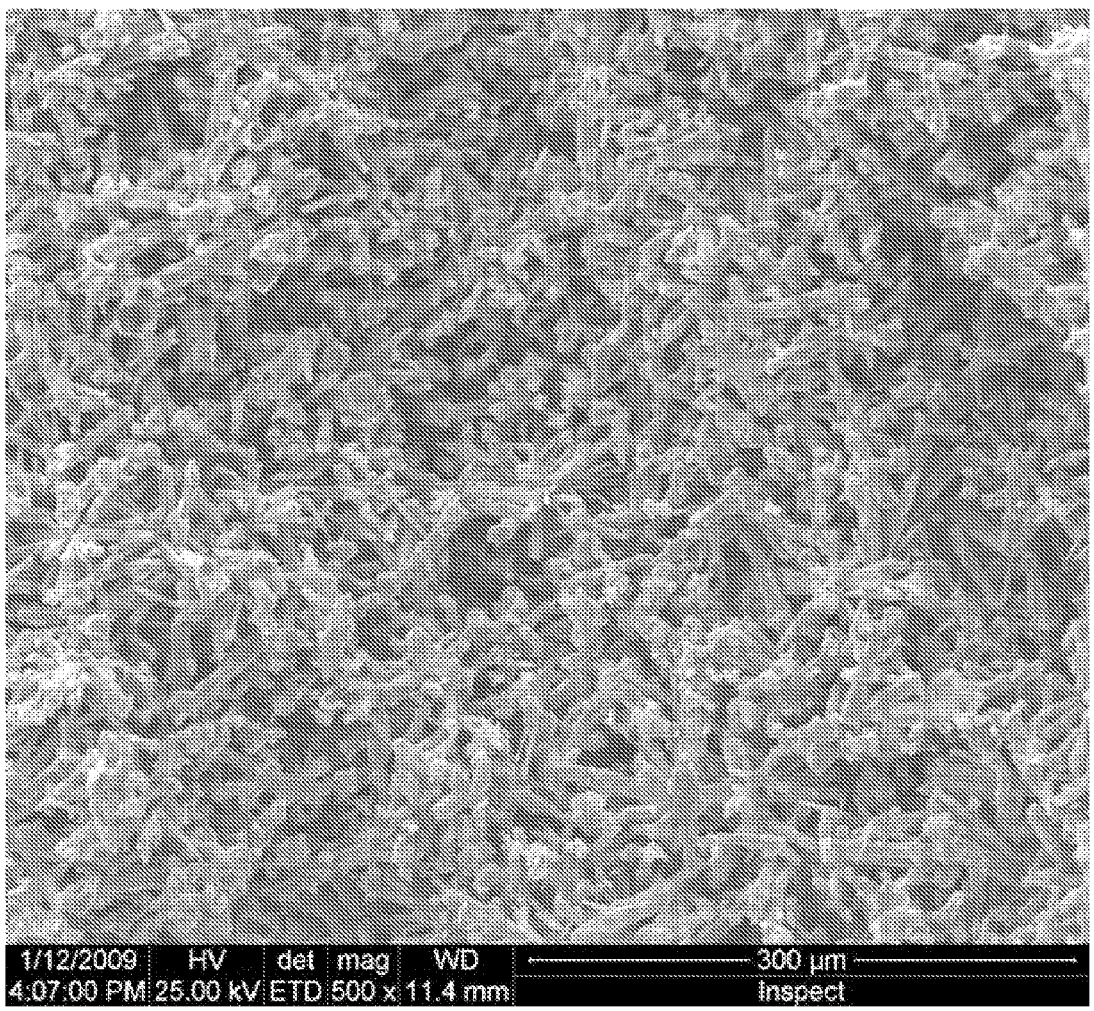

FIG. 1A is a micrograph of Comparative Sample C-5.
FIG. 1B is a micrograph of Example 18.
FIG. 1C is a micrograph of Example 19.
FIG. 1D is a micrograph of Example 20.
FIG. 2 is a micrograph of Example 32.

In the first variation of this process, acicular mullite is formed from a green body which is composed at least in part of a source of aluminum atoms, a source of silicon atoms, and a source of magnesium atoms. The green body is formed in substantially the shape and dimensions required of the final part.

Suitable aluminum, silicon and magnesium sources include materials such as described in WO 92/11219, WO 03/082773, WO 04/096729, EP 0 165 028 and U.S. Pat. No. 5,407,871. A single material may act as a source of both aluminum atoms and silicon atoms or of both magnesium atoms and silicon atoms. Examples of suitable aluminum sources include alumina and aluminum trifluoride. Various hydrated aluminum silicates such as clays, mullite and various zeolites are sources of both aluminum and silicon atoms. Crystalline silica (such as powdered quartz) is a useful source of silicon atoms, and can be used instead of or in addition to the hydrated aluminum silicates or mullite as the silicon source. Fumed silica is another useful source of silicon atoms. Because of its very small particle size and its amorphous structure, fumed silica tends to react more readily than crystalline silica sources, especially with the magnesium source in the cordierite-forming step. As a result, cordierite contents in the product composite more closely approximate the theoretical amounts when fumed silica is the silicon source, rather than crystalline silica.

Suitable sources of magnesium atoms include, for example, magnesium oxide, magnesium carbonate and magnesium hydroxide. An especially preferred precursor is a mixture of alumina, magnesium oxide and silica.

The ratio of starting materials in the green body depends on the relative proportions of cordierite and mullite that are desired in the product. Since cordierite formation is limited by the amount of magnesium that is present, it is convenient to express the number of moles of aluminum and silicon atoms in the starting mixture in relation to the number of moles of magnesium atoms that are present. Higher relative amounts of magnesium tend to produce a greater proportion of cordierite in the composite. The starting materials may contain from about 3.0 to 410 moles of aluminum atoms per mole of magnesium atoms, and from about 2.8 to 150 moles of silicon atoms per mole of magnesium atoms. These ratios can lead to the formation of a composite that contains about 20 to 99% by weight of mullite, based on the combined weight of the mullite and cordierite. A preferred mixture of starting materials contains from about 3.0 to 18 moles of aluminum atoms and from 2.8 to 8.0 moles of silicon atoms per mole of magnesium atoms. Such a preferred mixture typically produces a composite containing about 20 to 80% of mullite, based on the combined weight of mullite and cordierite. A more preferred starting mixture contains about 3.8 to 12 moles of aluminum atoms and from about 3 to about 6 moles of silicon atoms per mole of magnesium atoms, and typically produces a composite containing about 30 to 70% of mullite, based on the combined weight of mullite and cordierite.

The silicon atoms may be present in the green body in a substoichiometric amount, a stoichiometric amount, or in excess. By "stoichiometric" amount, it is meant the amount required to theoretically react with all of the aluminum and magnesium atoms in the green body to form mullite and cordierite. Applicants have found that cristobalite formation tends to be reduced when silicon is present in the green body in substoichiometric quantities, such as from 70 to 90% of the stoichiometric amount. However, an insufficiency of silicon atoms can lead to the formation of silicon-poor (relative to cordierite) magnesium-containing compounds such as sapphirine and/or spinel.

The sources of aluminum atoms, silicon and magnesium atoms suitably constitute from 55 to about 99 weight percent, preferably from 80 to 95 weight percent of the green body, exclusive of any binders and porogen particles that may be present.

The green body may contain various other materials, such as sintering aids, various impurities such as are often present in natural clay starting materials, or a compound such as is described in WO 04/096729. This compound is an oxide of one or more of Ca, Fe, Na, K, Ce, Pr, Nd, Sm, Eu, Gd, Tb, Dy, Ho, Er, Tm, Yb, Lu, B, Y, Sc and La, or a compound of one or more of the foregoing which forms an oxide when heated in air. If not an oxide, the compound may be, for example, a chloride, fluoride, nitrate, chlorate, carbonate or silicate, or a carboxylate such as acetate. More preferred compounds are those of Nd, B, Y, Ce and/or Fe. A preferred compound is a mixture of an Nd, Ce, Fe and/or B compound with a Ca, Y, Pr, Sm, Eu, Gd, Tb, Dy, Ho, Er, Tm, Yb, Lu, Sc and/or La compound. If the compound contains silicon (such as a silicate), the amount of silicon provided by the compound should be taken into account in calculating the aluminum-silicon ratio and magnesium-silicon ratio in the green body. The compound suitably constitutes at least 0.01, preferably at least 0.1, more preferably at least 0.5 and even more preferably at least 1 percent of the weight of the green body, exclusive of any binder or liquid that may be present. It may constitute as much as 12 percent of the weight of the green body, but preferably constitutes up to 10, more preferably up to about 5 and even more preferably up to 2 percent of the weight of the green body, exclusive of any binder or liquid.

A binder can be, and preferably is, mixed in with the other materials to help bind the particles of the starting materials together until the green body is fired. The binder is suitably an organic polymer, which may be soluble in water or some other solvent. A preferred type of binder is a water-soluble organic polymer, especially a cellulose ether. In general, the binder may constitute from about 1 to about 10 percent of the weight of the green body. A more preferred amount is from about 2 to 8 weight percent.

The green body may also contain one or more porogens. Preferred porogens include carbon or graphite particles. Carbon and graphite particles having particle sizes as described above are commercially available from many sources. One suitable source of carbon and graphite particles is Asbury Carbons, Inc., Asbury, N.J. The carbon or graphite particles preferably have a carbon content of at least 80% by weight, more preferably at least 90% by weight, even more preferably at least 95% by weight and still more preferably at least 98% by weight.

The green body is made by forming a mixture of the starting materials and shaping it. The green body can be prepared using any suitable method. Wet or dry methods can be used. Wet methods are preferred. In a wet method, a carrier liquid such as water or an organic liquid is blended with the starting materials to form a viscous putty or paste which can be processed by extrusion or molding techniques. Alcohols, glycols, ketones, ethers, aldehydes, esters, carboxylic acids, carboxylic acid chlorides, amides, amines, nitriles, nitro compounds, sulfides, sulfoxides, sulfones and the like are suitable carrier liquids, although water is most preferred. The amount of carrier fluid may affect the porosity of the composite, as larger amounts of carrier fluid occupy more of the volume of the green body. When the carrier fluid is removed, voids can form in the spaces formerly occupied by the carrier fluid, increasing the porosity of the composite. Increasing the amount of carrier fluid can also increase the amount of shrinkage that the part undergoes as it is transformed from the green body to the finished composite. Therefore, the amount of carrier fluid can be a process variable that can be controlled to affect to some extent certain properties of the final product.

The starting materials can be mixed together using ball milling, ribbon blending, vertical screw mixing, V-blending, attrition milling or any other suitable technique. The mixed materials are then formed into the desired shape, using, for example, processes such as injection molding, extrusion, isostatic pressing, slip casting, roll compaction, tape casting and the like. Suitable processes are described in *Introduction to the Principles of Ceramic Processing*, J., Reed, Chapters 20 and 21, Wiley Interscience, 1988. Binders may be burned out before the green body is converted to fluorotopaz and then to mullite.

If a binder or porogen is present or a wet method is used to produce the green body, the green body should be dried and the binder and/or porogen burnt out. The green body may be calcined prior to performing the mullitization reaction. Calcination can be performed on a green body made in a dry method, as well. These steps are done by heating the green body under vacuum or in an inert atmosphere such as nitrogen or a noble gas. Binder and porogen removal can be performed at temperatures of 300 to 900° C. Calcination occurs at a temperature of at least 1100° C., up to 1400° C. The calcination step is conducted for a period of time sufficient to increase the fracture strength of the green body. The amount of time needed will depend somewhat on the part size and porosity. Typically, from 15 minutes to 5 hours is sufficient.

In the first variation of the process, the green body is converted to acicular mullite and then partially to cordierite in a three-step process. In the first step, the green body is heated in the presence of a process gas that comprises a fluorine-containing compound. This step forms a fluorotopaz from a portion of the starting materials. In the second step, the fluorotopaz decomposes to form acicular mullite. In the third step, a portion of the acicular mullite reacts with the source of magnesium atoms and the remaining portion of the source of silicon atoms to form cordierite. The result is a composite of mullite and cordierite. This composite may contain up to 20% by weight of other materials.

The first, fluorotopaz-forming step is performed by heating the green body in the presence of a process gas that contains a fluorine-containing compound. The fluorine-containing compound is suitably $SiF_4$, $AlF_3$, HF, $Na_2SiF_6$, NaF, $NH_4F$, fluorocarbon-containing gas, or some mixture of any two or more thereof. $SiF_4$ is preferred. The temperature during this step may be from 700° C. to as high as 1200° C. However, temperatures of 900° C. or lower, especially 800° C. or lower, are preferred during this step, as at higher temperatures the fluorotopaz decomposition reaction can predominate. The lower temperatures permit the fluorotopaz formation to occur separately from the decomposition reaction that converts fluorotopaz to mullite. It is typically preferred to heat the green body under vacuum or an inert atmosphere such as nitrogen or a noble gas until it attains a temperature of at least 500° C. Thereafter, the fluorine-containing compound is introduced into the furnace, and heating is continued until the desired temperature for the fluorotopaz-forming step is achieved.

The process gas during the fluorotopaz-forming reaction may contain up to 100% of the fluorine-containing compound, but it is also possible to use a mixture that contains from 80 to 99%, especially from 85 to 95%, by weight of the fluorine-containing compound, with the remainder being various gaseous by-products that form from impurities contained in the starting materials or from the fluorotopaz-forming or mullite-forming reactions.

A flow of the process gas may be established in the furnace during the fluorotopaz-forming step. This may promote more uniform reaction rates between individual bodies that are being processed together, and in some cases even within a single body, by replenishing the fluorine-containing compound to regions of the oven from which it may have become depleted.

The partial pressure of the fluorine-containing compound in the furnace throughout the first reaction step can be adjusted or maintained to a desired level, and/or may be allowed to vary during the course of the reaction. Control over the partial pressure of the fluorine-containing compound allows for some control over the reaction rate, which in turn allows for some control over the temperature of the green body or bodies during the fluorotopaz-forming step. The partial pressure of the fluorine-containing compound may be as low as 0 torr in early stages of the reaction, when the fluorine-containing compound can be consumed at about the same rate as it is fed into the reaction. The reaction vessel instead may be maintained at a predetermined partial pressure of the fluorine-containing compound, at least during the latter stages of the fluorotopaz-forming reaction. In such a case, a typical partial pressure of the fluorine-containing compound is from 400 to 1000 torr (53.2 to 133.3 kPa), especially from 400 to 750 torr 53.2 to 99.7 kPa.

It is believed that most (80% or more) or essentially all (95-100%) of the aluminum atoms in the green body become incorporated into fluorotopaz during the fluorotopaz-forming reaction. The body at this point mainly contains fluorotopaz, the magnesium source, which may have been converted to magnesium fluoride, and any silica (or other unreacted source of silicon atoms) which may remain unconsumed after the fluorotopaz-forming reaction is completed. Therefore, it is believed that little or no cordierite is formed at this stage in the process.

After the fluorotopaz is formed, the body is heated under conditions such that the fluorotopaz decomposes to form acicular mullite. Fluorotopaz is decomposed by further increasing the reaction temperature, decreasing the partial pressure of the fluorine-containing compound, or by some combination of both. Fluorotopaz releases silicon tetrafluoride gas as it decomposes. This process is endothermic. The temperature during the fluorotopaz-decomposition step is preferably at least 900° C., and may be as high as 1200° C. A more preferred temperature is at least 1050° C., or at least 1100° C. The body should be held at that temperature until the fluorotopaz decomposition is complete. The decomposition reaction is complete when the body no longer releases silicon tetrafluoride.

The fluorotopaz decomposition reaction is generally performed in a non-oxidizing atmosphere. The fluorine-containing compound may be present in the process gas during this step, but the partial pressure thereof is advantageously not greater than 755 torr (100 kPa) and can be any lower value, including zero torr. The partial pressure of the fluorine-containing compound can be used as a process variable for controlling the size of the mullite needles that are formed during this step. In addition, applicants have found that the partial pressure of the fluorine-containing compound in this second step of the reaction can influence the formation of parasitic phases, especially cristobalite. A lower partial pressure of the fluorine-containing compound in this second step has been found to reduce the amount of cristobalite that forms in the composite. Therefore, it is preferred to conduct this second step in an atmosphere that contains either none of the fluorine-containing compound or a partial pressure of the fluorine-containing compound which is no more than 250 torr (33.2 kPa), preferably from 50 to 250 torr (6.7 to 33.2 kPa) or from 50 to 150 torr (6.7 to 20 kPa). This approach to controlling cristobalite formation is a generally preferable one, as stoichiometric amounts (or more) of the silicon source can be present in the green body. The presence of at least stoichiometric amounts of silicon helps to minimize the formation of parasitic magnesium-containing phases such as sapphirine and spinel.

As the fluorotopaz decomposes, acicular mullite crystals form in the body. The acicular mullite crystals are bonded together at points of contact to form a porous mass having essentially the same overall geometry and dimensions as the green body. The aspect ratio of the mullite crystals is typically at least 5, preferably at least 10, more preferably at least 20. The crystals may have a mean grain diameter of 5 to 50 microns.

At the end of the fluorotopaz decomposition reaction, the body contains mainly acicular mullite and the magnesium source, which is usually converted to magnesium fluoride at this stage. Some unconsumed silicon source will also be present at this stage. The body at this stage of the process has a porous structure that is typical of acicular mullite. The acicular mullite in the structure takes the form of elongated needles which are joined together at the points where they intersect.

This acicular mullite body is further heated to produce cordierite. The temperature during this cordierite-forming step is suitably from 1200 to 1460° C., preferably from 1300 to 1430° C. This step can be performed under vacuum, or under an inert atmosphere (i.e., one which does not interfere with the cordierite-forming reaction or otherwise consume mullite or cordierite) such as air, nitrogen or other inert gas.

The atmosphere may contain some moisture to facilitate the removal of residual fluorine during this step. During this heating step, the magnesium source, the unconsumed portion of the silica source and some of the acicular mullite react to produce the cordierite component. It is preferred to continue the heating step until at least 90%, and more preferably at least 98% of the magnesium atoms in the body have been consumed to form cordierite.

The cordierite-forming reaction consumes mullite. Generally, two moles of mullite are consumed to produce three moles of cordierite. Magnesium atoms and silicon atoms (in addition to the silicon atoms in the mullite crystal structure) also are needed. The amount of cordierite that forms is generally limited by the availability of both magnesium atoms and silicon atoms. In addition, it has been found that the amount of cordierite that forms often is somewhat less than that which is predicted from the composition of the green body. This may be attributed in part to the fact that the reaction involves solid-state materials. The extent to which cordierite can form depends on how well the magnesium source (typically in the form of $MgF_2$ at this stage of the process) is distributed about the previously-formed acicular mullite structure. Solid-state reactions occur only when the reactants are in close physical proximity; if the reactants are too distant, they cannot react even if thermodynamic conditions and accompanying kinetic factors are favorable. Therefore, if the magnesium source is poorly distributed, localized, magnesium-rich regions can be present. These can remain unreacted or, if present in a region that is locally poor in silicon, can form parasitic magnesium compounds such as sapphirine and/or spinel. Good distribution of the magnesium source in the green body favors more complete conversion of the magnesium source to cordierite. This is favored by thoroughly mixing the starting powders and using smaller particle size powders to form the green body.

Another reason for the lower-than-expected cordierite formation may be that, during the flurotopaz-forming reaction, the gaseous fluorine-containing compound may react with magnesium and aluminum compounds in the body to form volatile species such as aluminum trifluoride and magnesium difluoride. These volatile materials may escape from the body under the conditions of the fluorotopaz-decomposition reaction, thereby depriving the body of aluminum and especially magnesium atoms as needed to form the cordierite, resulting in less cordierite formation than expected. Reducing the partial pressure of the fluorine-containing compound during this step is believed to reduce the extent of this volatilization of aluminum and magnesium compounds from the body.

It may be necessary or desirable to remove residual fluorine from the composite. This is conveniently accomplished by heating the composite to a temperature of at least 1200° C., such as from 1200 to 1460° C. for a period of time. This heating step is preferably performed in the presence of an atmosphere that contains some water, such as moist air or other inert atmosphere which contains some quantity of moisture. The amount of water needed in atmosphere is generally not large, and the ambient humidity is usually sufficient. This heating step can be performed simultaneously with the cordierite-forming step described before, which is preferred because doing so eliminates a separate process step and associated costs.

In the second variation of the process, a porous, acicular mullite body is formed in any convenient manner, in the substantial absence of a source of magnesium atoms other than a small amount (typically not more than 1 weight percent) that might be present as a processing aid. Typically, this is done by forming a green body containing a source of aluminum and silicon atoms, heating it in the presence of a $SiF_4$ to form a fluorotopaz and then decomposing the fluorotopaz to form the acicular mullite body. A source of magnesium atoms is then applied to the acicular mullite body, and the body is heated to 1200-1460° C. under vacuum, in air, nitrogen or other inert atmosphere to convert the magnesium source and a portion of the mullite to cordierite. A convenient way of applying the source of magnesium atoms to the body is to soak the body in a slurry of particles or solution of the magnesium source, and then drying at an elevated temperature if desired. This step can be performed multiple times as needed to provide the desired quantity of magnesium atoms.

Additional silicon atoms are also needed to convert mullite to cordierite. In the second variation of the process, these additional silicon atoms can be added when the green body is formed (by incorporating an excess of what is needed to form the acicular mullite), or after the acicular mullite body has been formed. In the latter case, the source of silicon atoms can be applied in the same manner, and optionally at the same time, as the source of magnesium atoms.

In the second variation of the process, the amount of acicular mullite, and added magnesium source (plus any additional source of silicon atoms, if used) are advantageously such that, prior to the firing step, the starting materials contains from about 3.0 to 410 moles of aluminum atoms per mole of magnesium atoms, and from 2.8 to 150 moles of silicon atoms per mole of magnesium atoms. As before, a preferred mixture of starting materials contains from about 3.0 to 18 moles of aluminum atoms and from 2.8 to 8 moles of silicon atoms per mole of magnesium atoms and a more preferred starting mixture contains about 3.8 to 12 moles of aluminum atoms and from 3 to 6 moles of silicon atoms per mole of magnesium atoms.

The product of either variation of the process retains much of the porosity of the acicular mullite body. The body at this stage contains a lower proportion of mullite than before the cordierite-forming step is performed, but the needle structure is not significantly changed, at least at low to moderate levels of cordierite in the composite. As the cordierite content increases, the structure of the mullite needles tends to become less and less well-defined. However, the composite retains much of its porosity even when the cordierite content is quite high.

The product of the process of the invention is a composite of mullite and cordierite. The ratio of mullite to cordierite may range from 99:1 to 1:99 by weight. Preferably, this ratio is from 99:1 to 80:20 and more preferably is from 80:20 to 20:80. The ratio may be from 80:20 to 30:70, from 70:30 to 30:70 or from 70:30 to 40:60. The presence and relative proportions of the mullite and cordierite can be determined using, for example, X-ray methods on a sample that has been crushed to powder. As mentioned, the measured amount of cordierite in the product composite is often somewhat less than predicted from the ratios of starting materials.

A glassy oxide phase that may contain silicon and/or aluminum as well as one or more metals contributed by a sintering aid and/or other additional compounds as described before may also be present in the composite. The composite may in some cases contain products of an incomplete reaction of the starting materials. This may be caused because an excess of one or more of the starting materials was present.

The composite may contain small amounts of parasitic magnesium-containing compounds, such as, for example, sapphirine ($Mg_2Al_4SiO_{10}$) and/or spinel. These phases form at the expense of cordierite. Therefore, their presence in large amounts is undesirable. Preferably each of these phases constitutes no greater than 2%, preferably no greater than 1% and still more preferably no greater than 0.5% of the weight of the composite.

The open porosity of the composite can range from 30 to as much as 85 volume percent and more typically ranges from 45 to 75% or from 48 to 60%, as measured by water intrusion methods. The choice of starting materials to make the acicular mullite, especially the silicon source and the amount of carrier fluid, can affect the porosity of the composite. When fumed silica is used as the silicon source, porosities can be up to 50% greater than when powdered quartz is used. This is believed to be due to the large amount of carrier fluid that is needed to disperse fumed silica into the other materials when making the green body. When using powdered quartz as a source of silicon, porosities greater than about 50% typically require the presence of a porogen in the green body, particularly when sources of silica other than fumed silica are used in the synthesis. Porosities also tend to decrease somewhat with increasing cordierite content. Volume average pore diameter is typically less than 50 microns, and is often between 1 and 25 microns. Pore diameters are measured using mercury porosimetry methods.

The product generally has a lower CTE than acicular mullite bodies of comparable porosity. The product often has a CTE of no more than 5.0 ppm/° C., measured over the range from 20 to 800° C. The CTE tends to decrease with increasing cordierite content. Preferred products have a CTE of from 1.5 to 5.0 ppm/° C., and more preferably from 1.5 to 4.5 ppm/° C., over the range from 20 to 800° C.

The composite body also tends to have mechanical properties that are intermediate to those of acicular mullite and cordierite. An advantage of the invention is that fracture strength is increased significantly in comparison with cordierite bodies at similar porosities, mainly because the cordierite microstructure is not acicular. A very useful combination of fracture strength, porosity and thermal shock resistance is often achieved, especially at a mullite:cordierite ratio of from 70:30 to 40:60 by weight.

The ability of the composite body to withstand thermal shock gradients can be expressed in terms of a material thermal shock factor (MTSF), which is function of fracture strength, as determined by ASTM C1161-94, CTE and Young's modulus, as measured according to ASTM C1259-98, as follows:

$$\text{MTSF} = \text{fracture strength}/(\text{CTE} \times \text{Young's modulus})$$

The units of MTSF are ° C., with higher values indicating better thermal shock resistance. MTSF tends to increase with increasing cordierite content. Typical values are 200° C. or greater, up to as much as 600° C. For preferred composites that contain mullite:cordierite in a 70:30 to 40:60 ratio, MTSF values are often between 200 and 550° C., depending on porosity, processing conditions, and on other factors.

Composite bodies made in accordance with the invention are useful in a variety of filtration applications, and/or as carriers for various types of functional materials, of which catalysts are of particular interest. The thermal stability of the composite bodies makes them well suited for high temperature applications, such as for treating exhaust gases from mobile or stationary power plants.

The composite body can be used as a particulate filter, especially for removing particulate matter power plant (mobile or stationary) exhaust gases. A specific application of this type is a soot filter for an internal combustion engine, especially a diesel engine.

Functional materials can be applied to the composite body using various methods. The functional materials may be organic or inorganic. Inorganic functional materials such as metals and metal oxides, are of particular interest as many of these have desirable catalytic properties, function as sorbents or perform some other needed function. One method of introducing a metal or metal oxide onto the composite body is by impregnating the body with a solution of a salt or acid of the metal, and then heating or otherwise removing the solvent and, if necessary, calcining or otherwise decomposing the salt or acid to form the desired metal or metal oxide.

Thus, for example, an alumina coating or a coating of another metal oxide is often applied in order to provide a higher surface area upon which a catalytic or sorbent material can be deposited. Alumina can be deposited by impregnating the composite body with colloidal alumina, followed by drying, typically by passing a gas through the impregnated body. This procedure can be repeated as necessary to deposit a desired amount of alumina. Other ceramic coatings such as titania can be applied in an analogous manner.

Metals such as barium, platinum, palladium, silver, gold and the like can be deposited on the composite body by impregnating the body (which is preferably coated with alumina or other metal oxide) with a soluble salt of the metal, such as, for example, platinum nitrate, gold chloride, rhodium nitrate, tetraamine palladium nitrate, barium formate, followed by drying and preferably calcination. Catalytic converters for power plant exhaust streams, especially for vehicles, can be prepared from the composite body in that manner.

Suitable methods for depositing various inorganic materials onto a porous mullite body are described, for example, in US 2005/0113249 and WO 01/045828. These processes are generally useful in relation to the composite body of this invention.

In an especially preferred embodiment, alumina and platinum, alumina and barium or alumina, barium and platinum can be deposited onto the composite body in one or more steps to from a filter that is simultaneously capable of removing particulates such as soot, $NO_x$ compounds, carbon monoxide and hydrocarbons from a power plant exhaust, such as from vehicle engines.

The following examples are provided to illustrate the invention but are not intended to limit the scope thereof. All parts and percentages are by weight unless otherwise indicated.

EXAMPLES 1-7 AND COMPARATIVE SAMPLES C-1 AND C-2

Composite Examples 1-7 and Comparative Sample C-2 are made by homogenizing mixtures of MgO, $Al_2O_3$ and crystalline $SiO_2$ (powdered quartz) and then pressing the resulting mixtures into round, 25-mm diameter, 4-mm thick pellets at about 1000 kg of pressure. Ratios of starting materials are shown in Table 1. The pellets are heated under vacuum to 700° C. $SiF_4$ gas is then introduced to a partial pressure of 600 torr (79.8 kPa) over the course of about one hour. The reactor is held at 700° C. for one hour, and the temperature is then increased at a rate of 1-2° C./minute until the temperature reaches 1100° C. At the temperature of about 1030° C., the $SiF_4$ pressure is decreased to 500 torr (166.7 kPa). The reactor is held at 1100° C. for 3 hours, holding $SiF_4$ pressure constant at 500 torr (166.7 kPa) as $SiF_4$ evolves due to the decomposition of fluorotopaz. The $SiF_4$ gas is then evacuated from the reactor and the temperature is lowered to room temperature.

The pellets at this point are gray in color. Surface electron microscopy shows the mullite crystals have a needle-like, highly porous morphology with small globules wedged between the mullite needles.

The pellets are then heated to 1400° C. in air at a rate of 2° C./min, and held at that temperature for about 6 hours. The pellets are then cooled to room temperature at the rate of 3° C./minute. This operation does not change the size or shape of the pellets, but the pellets have lost the gray color and now appear white. X-ray diffraction analysis on powdered portions of the pellets is performed to determine the composition of their crystalline components. Results are indicated in Table 1.

The water-accessible porosity and CTE of the pellets are determined in each case, with results as indicated in Table 1.

Surface electron microscopy shows that the needle-like microstructure is well-preserved until the cordierite content exceeds 55% by weight, although needle surfaces appear etched and crystallite edges are less sharp than before. At cordierite contents above 55% (Examples 6 and 7), the needle morphology can still be determined, but is less predominant than in Examples 1-5.

Comparative Sample C-1 is made in the same manner, but without any source of magnesium atoms. Results are shown in Table 1.

TABLE 1

| | Example or Comparative Sample No. | | | | | | | | |
|---|---|---|---|---|---|---|---|---|---|
| | C-1 | C-2 | 1 | 2 | 3 | 4 | 5 | 6 | 7 |
| Starting Materials | | | | | | | | | |
| Mol-% MgO | 0 | 1.9 | 3.7 | 8.5 | 10.5 | 15.5 | 17.4 | 19.5 | 20.9 |
| Mol-% $Al_2O_3$ | 60 | 56.7 | 53.7 | 47.4 | 42.2 | 35.2 | 30.4 | 26.8 | 24.4 |
| Mol-% $SiO_2$ | 40 | 41.4 | 42.6 | 44.1 | 47.3 | 49.3 | 52.2 | 53.7 | 54.7 |
| Composite Properties | | | | | | | | | |
| Wt-% Cordierite (XRD) | 0 | 0 | 5 | 15 | 31 | 45 | 55 | 84 | 80 |
| Wt-% Mullite (XRD) | 98 | 99 | 95 | 85 | 67 | 47 | 33 | 14 | 15 |
| Other crystalline phase, wt-% (type[1]) | 2 (A) | 1 (A) | 0 | 0 | 2 (A) | 8 (A) | 12 (A) | 2 (B) | 5 (A) |
| Water-accessible porosity, % | 59 | 59 | 57 | 55 | 51 | 49 | 48 | 45 | 47 |
| CTE, ppm/° C. | 5.3 | 5.13 | 4.86 | 4.19 | 3.72 | 3.67 | 3.35 | 1.72 | 1.72 |

[1]Crystalline phase type A is cristobalite; type B is other silica, by XRD.

In each case, a highly porous mullite structure is formed. Porosity and CTE tend to decrease with increasing cordierite content.

EXAMPLES 8-9 AND COMPARATIVE SAMPLE C-3

Examples 8-9 and Comparative Sample C-3 are made by mixing mixtures of MgO, $Al_2O_3$ and fumed silica in an aqueous suspension, removing the water via a rotary evaporator and then drying the mixture overnight at 115° C. The resulting solid mixture is ground and pressed into pellets as described in the preceding examples. The pellets are converted sequentially to fluorotopaz, acicular mullite, and mullite-cordierite composites following the general procedure described in previous examples. For examples 8-9, the fluorotopaz decomposition reaction is performed at 1100° C. The ratios of starting materials and properties of the resulting composites are indicated in Table 2.

TABLE 2

| | Example No. | | |
|---|---|---|---|
| | C-3 | 8 | 9 |
| Starting Materials | | | |
| Mol-% MgO | 1.9 | 8.5 | 15.5 |
| Mol-% $Al_2O_3$ | 56.7 | 47.4 | 35.2 |
| Mol-% $SiO_2$ | 41.4 | 44.1 | 49.3 |
| Composite Properties | | | |
| Wt-% Cordierite (XRD) | 0 | 12 | 54 |
| Wt-% Mullite (XRD) | 99 | 88 | 46 |
| Other crystalline phase, wt-% (type[1]) | 1 (B) | 0 | 0 |
| Water-accessible porosity, % | 72 | 72 | 70 |
| CTE, ppm/° C. | 5.42 | 4.86 | 3.64 |

[1]Crystalline phase type A is cristobalite; type B is other silica, by XRD.

EXAMPLES 10-16 AND COMPARATIVE SAMPLE C-4

An acicular mullite body having a porosity of 69% is made according to the general procedures described in WO 03/082773. The body is cut into rectangular pieces each weighing about 2 grams. The pieces are dipped individually into an aqueous slurry containing 0.1 micron magnesium oxide and silicon oxide particles, at a weight ratio of approximately 1:2.75. The pieces are then dried in an oven with forced air circulation at about 120° C. The process deposits magnesium oxide and silicon oxide particles into the spaces between the mullite. The deposition process is repeated several times in some cases in order to obtain desired loadings. The loading is determined by weighing the pieces before and after the deposition process. The loading and theoretical amount of cordierite that will be formed as a result of that loading are indicated in Table 3.

Cordierite is formed by heating the loaded samples to 1400° C. in air for six hours, followed by cooling to room temperature. The composition of the resulting composites is determined by X-ray diffraction. Porosity and CTE are determined as before. The density also is determined in each case. Results are as indicated in Table 3.

TABLE 3

| | Example or Comparative Sample No. | | | | | | | |
|---|---|---|---|---|---|---|---|---|
| | C-4 | 10 | 11 | 12 | 13 | 14 | 15 | 16 |
| MgO/SiO$_2$ loading, wt-% | 0 | 3.6 | 5.8 | 12.3 | 18.1 | 25.0 | 33.3 | 51.2 |
| Targeted Cordierite Content, wt-% | 0 | 6.8 | 10.7 | 21.3 | 29.7 | 38.9 | 48.6 | 65.9 |
| Actual Cordierite Content, wt-% | 0 | 3.0 | 6.1 | 17.0 | 29.3 | 34.0 | 41.3 | 65.4 |
| Porosity, % | 69 | 67 | 65 | 60 | 58 | 54 | 53 | 39 |
| CTE, ppm/° C. | 5.44 | 5.21 | 5.24 | 4.69 | 4.21 | 3.87 | 3.67 | 3.04 |
| Density, g/cm$^3$ | 3.15 | 3.11 | 3.10 | 3.02 | 2.96 | 2.91 | 2.86 | 2.75 |

EXAMPLES 17-21 AND COMPARATIVE SAMPLE C-5

Composite Examples 17-21 and Comparative Sample C-5 are made by dry blending mixtures of a 325-mesh size magnesia, kappa-Al$_2$O$_3$ and crystalline SiO$_2$ (400 mesh size powdered quartz). The mixtures are then mixed with water and a binder (methyl cellulose) and extruded into 65-mm long bars having a rectangular cross-sectional shape 12.5×1.75 mm in dimension. The bars are dried in air for about one week, and debindered by heating at 1000° C. in air. The bars are then reacted to form acicular mullite and then cordierite as follows. The starting materials used to make each of Composite Examples 17-21 and Comparative Sample C-5 are shown in Table 4.

The bars are brought to a temperature of 700° C. under vacuum and stabilized at that temperature. SiF$_4$ is added over 5 hours to reach a pressure of 200 torr (26.6 kPa), during which time fluorotopaz forms in the bars. The reaction is then evacuated over about 2 hours, and after about a total of about 530 minutes, the reactor is filled with SiF$_4$ to about 410 torr (54.5 kPa). After the pressure is stabilized, the temperature is raised at the rate of 2° C./minute. When the temperature reaches about 1000° C., the pressure is reduced to 150 torr (20 kPa) and rate of temperature rise is decreased to 1° C./minute, until a temperature of 1100° C. is achieved. The temperature and pressure are then held steady at 1100° C. and 150 torr (20 kPa) for two hours to allow the fluorotopaz to decompose and form acicular mullite. The SiF$_4$ pressure is then gradually lowered and the reactor cooled to room temperature.

The samples are then heated to 1400° C. in air for about six hours to produce cordierite and to rid the composites of undesired fluoride residues. The bars are then evaluated for porosity using water intrusion methods. Fracture strength is measured on the bars according to ASTM C1161-95, using a 4-point bend test and an Instron tester. Young's modulus is calculated according to ATSM C1259-98 by measuring flexural frequencies via mechanical pulse excitation methods on an J. W. Lemmens Mk5 instrument. MTSF is calculated from fracture strength, CTE and Young's modulus as described before. Results are as indicated in Table 4.

TABLE 4

| | Example or Comparative Sample No. | | | | | |
|---|---|---|---|---|---|---|
| | C-5 | 17 | 18 | 19 | 20 | 21 |
| Starting Materials | | | | | | |
| MgO, g | 0 | 2.76 | 5.51 | 8.27 | 11.02 | 13.78 |
| Al$_2$O$_3$, g | 71.80 | 64.41 | 57.02 | 49.64 | 42.25 | 34.86 |
| SiO$_2$, g | 28.20 | 32.83 | 37.47 | 42.10 | 46.73 | 51.36 |
| Binder, g | 7 | 7 | 7 | 7 | 7 | 7 |
| Water, mL | 50 | 51 | 51 | 50 | 49 | 48 |
| Expected Cordierite Content, wt-% | 0 | 20 | 40 | 60 | 80 | 100 |
| Composite Properties | | | | | | |
| Wt-% Cordierite (XRD) | 0 | 12 | 33 | 55 | 72 | 88 |
| Wt-% Mullite (XRD) | 100 | 88 | 67 | 45 | 28 | 12 |
| Other crystalline phase, wt-% (type[1]) | None | None | None | None | None | None |
| Water-accessible porosity, % | 58 | 54 | 53 | 50 | 49 | 49 |
| CTE, ppm/° C. | 5.20 | 4.81 | 4.00 | 3.43 | 2.86 | 2.01 |
| Fracture Strength, MPa | 23 | 38 | 33 | 24 | 28 | 19 |
| Young's Modulus | 30 | 42 | 37 | 33 | 28 | 22 |
| MTSF, ° C. | 146 | 186 | 219 | 216 | 337 | 445 |

The production method used to prepare Composite Examples 17-21 results in composites that contain essentially all mullite and cordierite. Parasitic cristobalite, sapphirine and spinel phases are essentially absent from these Composite Examples. CTE values fall with increasing cordierite content, suggesting that in each case the cordierite has interrupted the continuous mullite crystalline needle structure. Fracture strength generally decreases with increasing cordierite content. The values for Comparative Example C-5 and Example 17 are believed to be somewhat anomalous. Modulus also decreases with increasing cordierite content. Material thermal shock factor increases with increasing cordierite content.

These results show that the process of the invention can provide a porous ceramic that is characterized with very good porosity, much better material thermal shock resistance than acicular mullite, and much better fracture strength and modulus than cordierite.

Micrographs are taken of each of Comparative Sample C-5 and Examples 18, 19 and 20. Those micrographs form FIGS.

1A, 1B, 1C and 1D, respectively. As seen in FIG. 1A, the 100% mullite material contains long needles which extend quite far from the surface of the material. When the cordierite content is increased to 33%, as in Example 18 (FIG. 1B), the needle structure is maintained, but the needles at the surface tend to be shorter, and do not protrude as far from the surface of the material. Further increases in the cordierite content, to 55% and to 72%, lead to shorter needle formation and still smoother surfaces. The smoother surface is desirable in filter applications and other applications in which a fluid is to flow through the composite material. The smoother surface builds less pressure drop through the device, allowing lower operating pressures to be used.

EXAMPLES 22-26 AND COMPARATIVE SAMPLES C-6

Composite Examples 22-26 and Comparative Sample C-6 are made in the same general method as described with respect to Composite Examples 17-21 and Comparative Sample C-5, except that fumed silica is now the silicon source. The method is modified slightly in that the fumed silica is mixed with the other ceramic powders in aqueous suspension, rather than by dry mixing. The suspension is mixed for one hour at room temperature, and the liquid is then removed by rotoevaporation and drying at 115° C. The dried material is ground in a mortar and pestle before being formed into bars and fired as described in Examples 17-21. Formulation details are provided in Table 5.

The fired bars are evaluated in the same manner as described for Examples 17-21 and Comparative Sample C-5. Results are as indicated in Table 5.

these materials. As before, these results show that the process of the invention can provide a porous ceramic that is characterized with very good porosity, much better material thermal shock resistance than acicular mullite, and much better fracture strength and modulus than cordierite.

EXAMPLES 27-31 AND COMPARATIVE SAMPLE C-7

Composite Examples 27-31 and Comparative Sample C-7 are made by dry blending mixtures of a 325-mesh size magnesia, kappa-$Al_2O_3$ and crystalline $SiO_2$ (400 mesh size powdered quartz). In these experiments, a substoichiometric amount of silica (80% of theoretical) is present in the green body. The starting materials used to make each of Composite Examples 27-31 and Comparative Samples C-7 are shown in Table 6.

The mixtures are then mixed with water and a binder (methyl cellulose) and extruded into 65-mm long bars having a rectangular cross-sectional shape 12.5×1.75 mm in dimension. The bars are dried in air for about one week and debindered by heating at 1000° C. in air. The bars are then reacted to form acicular mullite and then cordierite as follows.

The bars are brought to a temperature of 700° C. and stabilized at that temperature. $SiF_4$ is added to a pressure of 600 torr (79.9 kPa), during which time fluorotopaz forms in the bars. The bars are maintained at that temperature and $SiF_4$ pressure for about 150 minutes, and then the temperature is increased by 3° C./minute, then 2° C./minute and finally 1° C./minute until a temperature of 1100° C. is achieved. $SiF_4$ is spiked into the reactor periodically for the first 300 minutes of reaction time to maintain the reactor pressure at 600 torr (79.8

TABLE 5

| | Example or Comparative Sample No. | | | | | |
| --- | --- | --- | --- | --- | --- | --- |
| | C-6 | 22 | 23 | 24 | 25 | 26 |
| Starting Materials | | | | | | |
| MgO, g | 0 | 2.48 | 4.96 | 7.44 | 9.92 | 12.40 |
| $Al_2O_3$, g | 64.62 | 57.97 | 51.32 | 44.67 | 38.02 | 31.38 |
| Fumed silica, g | 25.38 | 29.55 | 33.72 | 37.89 | 42.05 | 46.22 |
| Binder, g | 6.3 | 6.3 | 6.3 | 6.3 | 6.3 | 6.3 |
| Water, mL | 72 | 70 | 77 | 77 | 84 | 93 |
| Expected Cordierite Content, wt-% | 0 | 20 | 40 | 60 | 80 | 100 |
| Composite Properties | | | | | | |
| Wt-% Cordierite (XRD) | 0 | 14 | 38 | 59 | 77 | 94 |
| Wt-% Mullite (XRD) | 98 | 86 | 62 | 41 | 23 | 6 |
| Other crystalline phase, wt-% (type[1]) | 1% Silica | None | None | None | None | None |
| Water-accessible porosity, % | 67 | 60 | 60 | 57 | 53 | 47 |
| CTE, ppm/° C. | 5.41 | 4.80 | 3.98 | 3.04 | 2.21 | 1.91 |
| Fracture Strength, MPa | 2.3 | 22 | 20 | 14 | 13.4 | 16 |
| Young's Modulus | 4 | 20 | 15 | 14 | 13 | 17 |
| MTSF, ° C. | 114 | 226 | 310 | 342 | 490 | 504 |

These results show how the substitution of fumed silica for powdered quartz affects the properties of the composite. The cordierite content in all cases is closer to the theoretical value than in the corresponding Composite Examples 17-21. Porosity is also generally higher, which is believed to be related to the higher amount of water used to produce the green body. Fracture strength and Young's modulus are somewhat lower, but this is believed to be attributable to the higher porosity of kPa). When the temperature reaches 1000° F., the $SiF_4$ pressure is reduced to 500 torr (66.6 kPa). The reactor is then held steady at 1100° C. and 500 torr (66.6 kPa) $SiF_4$ pressure for 3 hours. The $SiF_4$ pressure is then gradually lowered and the reactor cooled to room temperature.

The samples are then heated to 1400° C. in air for six hours to produce cordierite and to remove fluoride residues. The bars are then evaluated for porosity using water intrusion methods. Fracture strength is measured on the bars according to ASTM C1161-95, using a 4-point bend test and an Instron tester. Young's modulus is calculated according to ATSM C1259-98 by measuring flexural frequencies via mechanical pulse excitation methods on an J. W. Lemmens Mk5 instrument. MTSF is calculated from fracture strength, CTE and Young's modulus as described before. Results are as indicated in Table 6.

TABLE 6

| | Example or Comparative Sample No. | | | | | |
|---|---|---|---|---|---|---|
| | C-7 | 27 | 28 | 29 | 30 | 31 |
| Starting Materials | | | | | | |
| MgO, g | 0 | 2.76 | 5.51 | 8.27 | 11.02 | 13.78 |
| $Al_2O_3$, g | 71.80 | 64.41 | 57.02 | 49.64 | 42.25 | 34.86 |
| $SiO_2$, g | 22.56 | 26.27 | 29.97 | 33.68 | 37.38 | 41.09 |
| Binder, g | 6.61 | 6.54 | 6.48 | 6.41 | 6.35 | 6.28 |
| Water, mL | 48 | 48 | 48 | 48 | 48 | 48 |
| Expected Cordierite Content, wt-% | 0 | 20 | 40 | 60 | 80 | 100 |
| Composite Properties | | | | | | |
| Wt-% Cordierite (XRD) | 0 | 9 | 29 | 49 | 66 | 87 |
| Wt-% Mullite (XRD) | 94 | 90 | 70 | 49 | 31 | 10 |
| Other crystalline phase, wt-% (type[1]) | 6 (A) | 1 (A) | 1 (A) | 2 (C) | 2, 1 (A, C) | 1, 2 (A, C) |
| Water-accessible porosity, % | 54 | 55 | 53 | 51 | 49 | 49 |
| CTE, ppm/° C. | 5.50 | 5.05 | 4.23 | 3.19 | 3.11 | 1.84 |
| Fracture Strength, MPa | 15 | 40 | 23 | 20 | 20 | 10 |
| Young's Modulus | 19 | 41 | 29 | 28 | 27 | 14 |
| MTSF, ° C. | 148 | 191 | 186 | 223 | 234 | 373 |

[1]Crystalline phase type A is cristobalite; type B is other silica, type C is spinel, by XRD.

The production method used to prepare Composite Examples 27-31 results in composites that contain mostly mullite and cordierite, with small amounts of parasitic cristobalite and/or spinel. The presence of substoichiometric levels of silicon in the green body is therefore shown to largely suppress cristobalite formation, although it may promote some spinel formation. As in previous examples, CTE values fall with increasing cordierite content, indicating that in each case the cordierite has interrupted the continuous mullite crystalline needle structure. Fracture strength generally decreases with increasing cordierite content. Modulus also decreases with increasing cordierite content. Material thermal shock factor increases with increasing cordierite content.

Once again, these results show that the process of the invention can provide a porous ceramic that is characterized with very good porosity, much better material thermal shock resistance than acicular mullite, and much better fracture strength and modulus than cordierite.

EXAMPLE 32

35.50 g of kappa-$Al_2O_3$, 4.84 g of MgO, 0.68 g of $Fe_2O_3$, and 27.16 g of powdered quartz are homogenized in a small coffee grinder for 4 minutes. Then, 32.50 g of Asbury Grade A625 graphite is added as porogen and mixed for two additional minutes. Finally, 7.00 g of methyl cellulose is added and mixed for about a minute. 44.0 mL of distilled water is added, and the mixture is homogenized into a paste. This paste is extruded in form of flat bars of approximate dimensions 65×12×1.8 mm and dried in air for several days. The bars are loaded into a reactor that is evacuated and heated to 700° C. $SiF_4$ gas is introduced over 3 hours to reach pressure of 85 torr (11.3 kPa). After an additional hour at these conditions, temperature is increased at 2° C./min heating rate to 900° C., and at 1° C./min to 1100° C., while keeping the $SiF_4$ pressure at 85 torr (11.3 kPa). After another 60 minutes, the reactor is evacuated, backfilled with nitrogen, and cooled to room temperature. The mullitized bars are then heated in air to 1400° C. for 6 hrs and cooled.

A portion of the resulting product is powdered with mortar and pestle; powder XRD analysis reveals the crystalline phases of the sample contain 55% mullite and 45% cordierite by weight. Porosity is measured by the water absorption method, fracture strength by 4-point bend test, modulus by pulse excitation technique, CTE by a dilatometer at a 5° C./min heating rate between 25 and 800° C., and pore size by the mercury intrusion method. Results are:

| | |
|---|---|
| Porosity: | 67.3 ± 0.1% |
| Fracture strength: | 11 ± 1 MPa |
| Modulus: | 6.1 ± 0.1 GPa |
| $CTE^{(25-800° C.)}$: | 3.88 ± 0.09 ppm/° C. |
| MTSF: | 450 ± 50° C. |
| Average pore size: | 12.4 μm |

A micrograph of the product is shown as FIG. 2. As can be seen in FIG. 2, the composite has a highly porous structure, in which much of the needle-like morphology of the acicular mullite intermediate material has been retained.

What is claimed is:

1. A process for forming a composite body comprising firing an acicular mullite body in vacuum or an inert atmosphere in the presence of a source of silicon atoms and a source of magnesium atoms at a temperature of from 1200 to 1460° C. such that a portion of the acicular mullite reacts with the sources of silicon and magnesium atoms to form a composite body containing mullite and cordierite at a weight ratio of from 99:1 to 1:99, wherein the composite body contains at least 80% by weight combined of mullite and cordierite, wherein the composite body has a porosity of at least 30-volume percent and a coefficient of linear thermal expansion of no greater than 5.25 ppm/° C.

2. The process of claim 1, wherein prior to firing, the acicular mullite body, the source of silicon atoms and the source of magnesium atoms are present in amounts sufficient to provide from 3 to 12 moles of aluminum atoms and from 3 to 6 moles of silicon atoms per mole of magnesium atoms.

3. The process of claim 1, wherein the acicular mullite is prepared by
   (a) forming a green body containing a source of aluminum atoms, a source of silicon atoms and a source of magnesium atoms;
   (b) heating the green body in the presence of a gaseous fluorine source at a temperature sufficient to convert at least a portion of the green body to fluorotopaz; and
   (c) further heating the green body at a temperature of from 850° C. to 1250° C. under conditions such that the fluorotopaz decomposes to form a porous acicular mullite body that contains a source of magnesium atoms.

4. The process of claim 3, wherein in step (b), the gaseous fluorine source is $SiF_4$.

5. The process of claim 3, wherein in step (c) the partial pressure of the gaseous fluorine source is from 50 to 150 torr (6.7 to 20 kPa).

6. The process of claim 3 wherein the porous acicular mullite body formed in step (c) contains an unconsumed portion of the source of silicon atoms; and the process further comprises (d) further heating the acicular composite body to a temperature of from 1200 to 1460° C. such that a portion of the acicular mullite reacts with the source of magnesium atoms and the unconsumed portion of the source of silicon atoms to form cordierite.

7. A composite formed in the process of claim 6.

8. A composite formed in the process of claim 3.

9. The process of claim 1, wherein at least a portion of the source of magnesium atoms is applied to a previously-formed acicular mullite body.

10. The process of claim 9, wherein at least a portion of the source of silicon atoms is applied to a previously-formed acicular mullite body.

11. The process of claim 1, wherein the firing temperature is from 1200 to 1460° C.

12. The process of claim 1, wherein mullite is consumed as cordierite is formed.

13. The process of claim 1, wherein mullite and cordierite constitute at least 90% by weight of the composite body.

14. The process of claim 1, wherein the composite body has a porosity of from 45 to 75 volume percent.

15. The process of claim 1, wherein the composite body has a CTE of from 1.5 to 4.5 ppm/° C.

16. The process of claim 1, wherein the composite body contains mullite and cordierite in a weight ratio of from 70:30 to 40:60, based on the combined weight of the mullite and cordierite, the composite has a CTE of no greater than 1.5 to 4.5 ppm/° C. over the temperature range from 20 to 800° C., and the composite has a material thermal shock factor of between 200 and 600° C.

17. The process of claim 1, wherein the acicular mullite body is fired in the presence of an atmosphere that contains water and residual fluorine is removed during the firing step.

18. A composite formed in the process of claim 1.

* * * * *